(12) United States Patent
Oami

(10) Patent No.: US 11,227,376 B2
(45) Date of Patent: Jan. 18, 2022

(54) CAMERA LAYOUT SUITABILITY EVALUATION APPARATUS, CONTROL METHOD THEREOF, OPTIMUM CAMERA LAYOUT CALCULATION APPARATUS, AND COMPUTER READABLE MEDIUM

(71) Applicant: NEC CORPORATION, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/040,223

(22) PCT Filed: Mar. 29, 2018

(86) PCT No.: PCT/JP2018/013227
§ 371 (c)(1),
(2) Date: Sep. 22, 2020

(87) PCT Pub. No.: WO2019/186889
PCT Pub. Date: Oct. 3, 2019

(65) Prior Publication Data
US 2021/0012480 A1    Jan. 14, 2021

(51) Int. Cl.
*G06K 9/00* (2006.01)
*G06T 7/00* (2017.01)
(52) U.S. Cl.
CPC .. *G06T 7/0002* (2013.01); *G06T 2207/20076* (2013.01); *G06T 2207/30232* (2013.01)
(58) Field of Classification Search
CPC ......... G06T 7/0002; G06T 2207/20076; G06T 2207/30232; G06T 2207/30168;
(Continued)

(56) References Cited

U.S. PATENT DOCUMENTS

2018/0122062 A1*   5/2018   Takenaka ............. G06Q 10/087

FOREIGN PATENT DOCUMENTS

| JP | 2013-097532 A | 5/2013 |
|---|---|---|
| WO | 2014/002398 A1 | 1/2014 |
| WO | 2014/203389 A1 | 12/2014 |

OTHER PUBLICATIONS

International Search Report for PCT/JP2018/013227 dated Jun. 12, 2018 [PCT/ISA/210].

* cited by examiner

*Primary Examiner* — Stephen P Coleman
(74) *Attorney, Agent, or Firm* — Sughrue Mion, PLLC

(57) ABSTRACT

A parameter calculation unit calculates, for camera layout information of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on an environmental object. A suitability calculation unit calculates camera layout suitability based on image processing characteristic information representing a characteristic of the image processing and the image processing performance parameter, the camera layout suitability being an index of a level of suitability of a camera layout represented by the camera layout information for image processing of the object.

10 Claims, 12 Drawing Sheets

(58) Field of Classification Search
CPC ........ G06T 2207/30196; G06T 7/0006; H04N 5/247; H04N 5/232; H04N 17/00
USPC ....................................................... 382/103
See application file for complete search history.

CAMERA LAYOUT SUITABILITY EVALUATION APPARATUS, CONTROL METHOD THEREOF, OPTIMUM CAMERA LAYOUT CALCULATION APPARATUS, AND COMPUTER READABLE MEDIUM

CROSS REFERENCE TO RELATED APPLICATIONS

This application is a National Stage of International Application No. PCT/JP2018/013227 filed Mar. 29, 2018.

TECHNICAL FIELD

The present disclosure relates to a camera layout suitability evaluation apparatus for evaluating whether a layout of a camera placed in a monitored area is suitable for image processing on an object projected in an image photographed by the camera.

BACKGROUND ART

A technique described in Patent Literature 1 has been known as a method of determining whether a camera layout is favorable when a camera layout of a camera placed in a monitored area is determined.

Patent Literature 1 discloses a technique of evaluating whether a camera layout (orientation and position of cameras) is suitable for specific image processing based on hiding of a target object by an obstacle, resolution, and a gazing point angle viewed from the cameras.

Patent Literature 2 discloses a technique for determining an optimum camera layout by an agent simulation. In the technique described in Patent Literature 2, first, a plurality of cameras are placed in an assumed monitored area, and a flow line of a person is measured to obtain person passing information. Next, the human traffic is reproduced by an agent simulation based on the obtained person passing information, differences between the measured values and the true values are calculated for various camera layouts in order to obtain a camera layout with the smallest difference.

CITATION LIST

Patent Literature

Patent Literature 1: International Patent Publication No. WO2014/002398
Patent Literature 2: International Patent Publication No. WO 2014/203389

SUMMARY OF INVENTION

Technical Problem

Further, the technique disclosed in Patent Literature 1 considers a structure of the monitored area and a fixed structural object placed inside the monitored area. However, the technique disclosed in Patent Literature 1 does not consider about information such as where an object to be monitored is likely to stay and where and how much objects are hidden, and thus does not consider about the possibility in which the objects overlap with each other and the camera layout becomes unsuitable for video processing. For this reason, with the technique disclosed in Patent Literature 1, the camera layout may not be necessarily suitable for image processing under a situation where a plurality of objects are present inside the monitored area and overlap with each other. Further, for example, a movable part such as a door on a shelf may be present in a part of a fixed structural object, and the object may be hidden depending on the state of the movable part, which may make it difficult to observe the object. However, in the technique described in Patent Literature 1, a situation in which the structural objects includes a movable part is not assumed.

Furthermore, the technique described in Patent Literature 2 requires a large number of cameras to be firstly placed in each monitored area to measure the human traffic, and thus it cannot be applied to a case in which the human traffic cannot be measured by installing a large number of cameras. Moreover, in the technique described in Patent Literature 2, since it is necessary to measure the human traffic again when the monitored area is changed, an enormous cost is incurred.

An object of the present disclosure is to provide a camera layout suitability evaluation apparatus that can solve the above-described problems and can more appropriately evaluate whether a camera layout is suitable for image processing on an object even under a situation where objects overlap each other or a situation where a structural object includes a movable part.

Solution to Problem

An example aspect is a camera layout suitability evaluation apparatus for evaluating whether a layout of a camera placed in a monitored area is suitable for image processing on an object projected in an image captured by the camera. The camera layout suitability evaluation apparatus includes:

an image processing performance parameter calculation unit configured to calculate, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and a camera layout suitability calculation unit configured to calculate camera layout suitability based on image processing characteristic information representing a characteristic of the image processing for the image processing performance parameter, the camera layout suitability being obtained by indexing a level of suitability of a camera layout represented by the camera layout information for the image processing of the object.

Another example aspect is a method of controlling a camera layout suitability evaluation apparatus for evaluating whether a layout of a camera placed in a monitored area is suitable for image processing on an object projected in an image captured by the camera. The method includes:

calculating, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and calculating camera layout suitability based on image processing characteristic information representing a characteristic of the image processing for the image processing performance parameter, the camera layout suitability being obtained by indexing a level of suitability of a camera layout represented by the camera layout information for the image processing of the object.

Another example aspect is a non-transitory computer readable medium storing a program to cause a computer for evaluating whether a layout of a camera placed in a monitored area is suitable for image processing on an object projected in an image captured by the camera to execute:

calculating, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and calculating camera layout suitability based on image processing characteristic information representing a characteristic of the image processing for the image processing performance parameter, the camera layout suitability being obtained by indexing a level of suitability of a camera layout represented by the camera layout information for the image processing of the object.

Advantageous Effects of Invention

According to the above example aspects, it is possible to provide a camera layout suitability evaluation apparatus that can solve the above-described problems and can more appropriately evaluate whether a camera layout is suitable for image processing on an object even under a situation where objects overlap each other or a situation where a structural object includes a movable part.

DESCRIPTION OF EMBODIMENTS

Hereinafter, embodiments of the present disclosure will be described with reference to the drawings. The following descriptions and drawings are omitted and simplified as appropriate for clear descriptions. Further, in the following drawings, the same elements are denoted by the same signs, and repeated descriptions are omitted as necessary.

Figure 1:
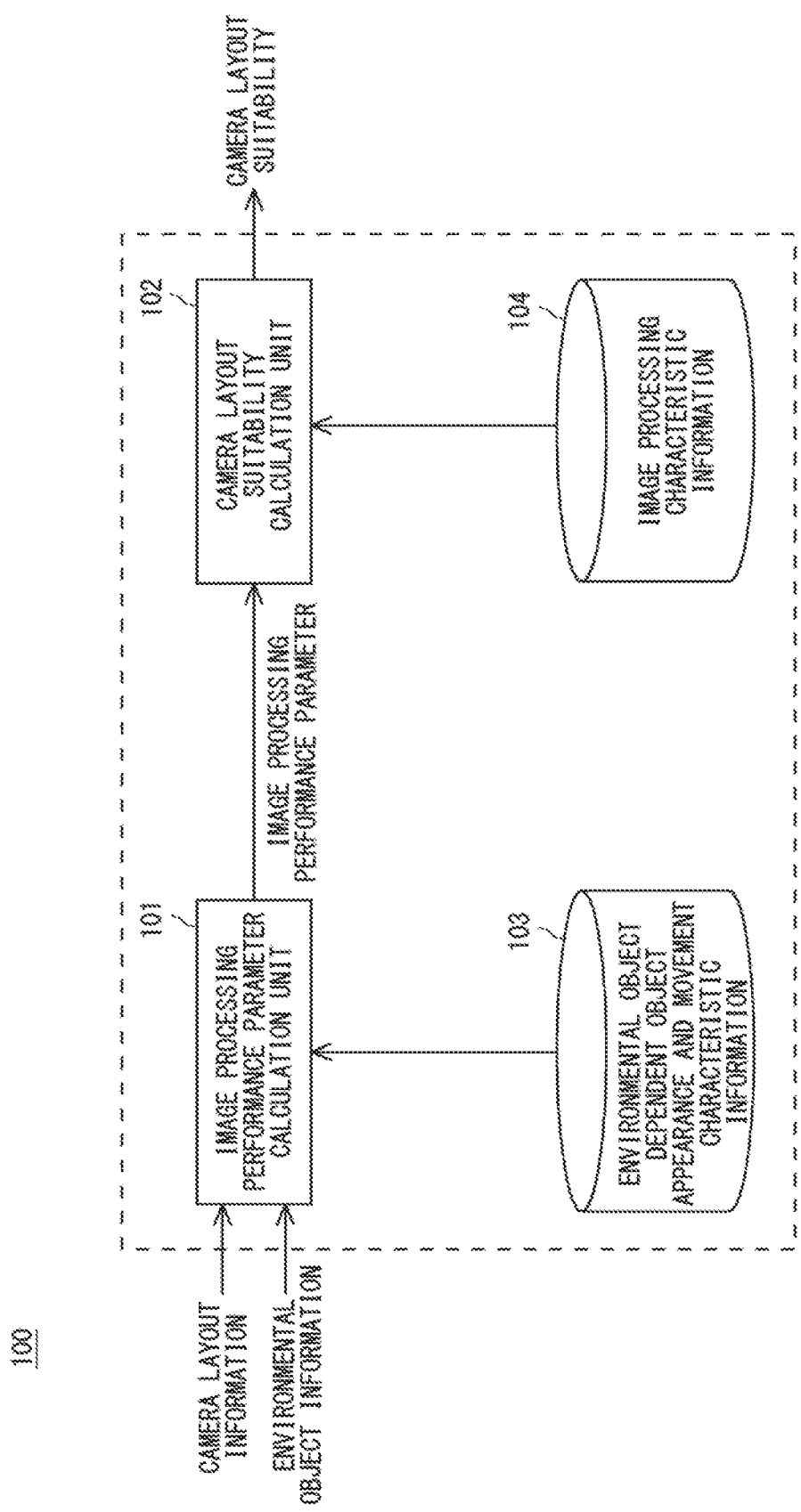
FIG. 1 is a block diagram showing a configuration example of a camera layout suitability evaluation apparatus 100 according to an example embodiment of the present disclosure.

FIG. 1 shows a configuration example of a camera layout suitability evaluation apparatus 100 according to an example embodiment of the present disclosure. The camera layout suitability evaluation apparatus 100 includes an image processing performance parameter calculation unit 101, a camera layout suitability calculation unit 102, an environmental object dependent object appearance and movement characteristic information storage unit 103, and an image processing characteristic information storage unit 104.

The image processing performance parameter calculation unit 101 calculates an image processing performance parameter based on environmental object dependent object appearance and movement characteristic information stored in the environmental object dependent object appearance and movement characteristic information storage unit 103 for camera layout information and environmental object information to be input, and outputs the calculated image processing performance parameter to the camera layout suitability calculation unit 102.

The camera layout suitability calculation unit 102 calculates camera layout suitability for assumed image processing based on image processing characteristic information stored in the image processing characteristic information storage unit 104 for the image processing performance parameter output from the image processing performance parameter calculation unit 101.

Next, an operation of the camera layout suitability evaluation apparatus 100 shown in FIG. 1 will be described.

First, the camera layout information and the environmental object information are input to the image processing performance parameter calculation unit 101.

The camera layout information here indicates at least a position, a pose, and an angle of view of a camera placed in the monitored area. Specifically, the camera layout information includes information such as a position and an installation height of the camera in the monitored area, an orientation of the camera (pose of the camera), and the zooming extent (angle of view). The camera layout information may be described in any form as long as it can be associated with environmental object information input at the same time as the camera layout information. For example, the camera layout information may be expressed by coordinates in the drawing of the monitored area. Alternatively, the camera layout information may be represented in a real world coordinate system defined with a certain point on a real space as an origin. Information such as the orientation and a zoom ratio of the camera of the camera layout information may be described by a camera parameter which determines this information.

The environmental object information is information about a structural object described in a drawing of the inside of the monitored area and information about a placed object placed in the structural object. Specifically, the structural object is a pillar, a wall, a fixture, lighting hanging from the ceiling, an advertisement, a display, a direction board, etc. placed in the monitored area. The structural object information is information such as a three-dimensional position and a size (both the three-dimensional position and the size include height information), a shape, an orientation, etc. of the structural object placed in the monitored area. The term "placed object" refers to an object placed in/on the structural object placed in the monitored area. When the inside of a store is the monitored area, the placed object is, for example, an item placed in/on a fixture placed as a structural object in the store. The placed object information is related to a type of the placed object placed in the structural object. For example, when the inside of a store is the monitored area, drawing information of a structural object such as a fixture and the like placed in the store and information of a type of an item placed in the fixture are input as the environmental object information. The structural object information may be described in any form as long as it can be associated with the above camera layout information. The information about the position and the height of the structural object may be represented by coordinates in the drawing or may be represented in a real world coordinate system.

The image processing performance parameter calculation unit 101 calculates an image processing performance parameter based on environmental object dependent object appearance and movement characteristic information stored in the environmental object dependent object appearance and movement characteristic information storage unit 103 for the input camera layout information and environmental object information.

Here, the image processing performance parameter is a parameter that affects the performance of image processing. The image processing performance parameter may be, for example, a resolution of an object to be processed, an orientation of the object, a movement of the object, or a hiding level indicating how much the object is hidden. Here, these items are collectively referred to as the image processing performance parameters. Note that the image processing performance parameter may be calculated as a representative value (e.g., average) of the entire monitored area, or may be calculated for each position within the monitored area. The method of calculating the image processing performance parameter will be described in more detail in the following specific example.

The environmental object dependent object appearance and movement characteristic information is related to characteristics of an appearance or a movement of an object determined depending on the environmental object. For example, when the monitored area is a store, and the object is a person, persons are likely to line up in front of a cash register inside the store. Moreover, persons browsing tend to stay in front of a book corner inside the store. It can be said that an occurrence of such a situation depends on structural objects such as cash registers and placed objects such as books. As a result, in these places, the appearance characteristic such that objects overlap each other and objects are likely to be hidden and the movement characteristic such that the object continues to stay there are generated. These characteristics are included in the environmental object dependent object appearance and movement characteristics information. In addition to these characteristics, there is regularity in the orientation, the direction of the movement of the object, and speed of the object at a specific place such as a queue. The movement characteristic such as regularity in the orientation of the object, the direction of the movement of the object, and speed of the object at a specific place are also included in the environmental object dependent object appearance and movement characteristic information. When a part of the structural object is a movable part, such as a door of a shelf, a part of the object may be shielded by the movement of the movable part. The appearance characteristic such that a part of the object is shielded by the movement of the movable part is also included in the environmental object dependent object appearance and movement characteristic information. Specific examples of the environmental object dependent object appearance and movement characteristic information are described in the section of the specific example.

In this way, information about the appearance and movement characteristics of the object determined depending on the environmental object is stored in the environmental object dependent object appearance and movement characteristic information storage unit 103 as the environmental object dependent object appearance and movement characteristic information. A more specific example of the environmental object dependent object appearance and movement characteristic information will be described later.

The image processing performance parameter calculation unit 101 extracts a structural object or a placed object that affects the appearance or movement characteristics of the object from among structural objects or placed objects included in the environmental object information. Then, the image processing performance parameter calculation unit 101 reads out the environmental object dependent object appearance and movement characteristic information associated with the extracted structural object or placed object from the environmental object dependent object appearance and movement characteristic information storage unit 103. The image processing performance parameter calculation unit 101 calculates the image processing performance parameter in the monitored area based on a distance from the camera to the monitored area and an angle at which the camera captures an object obtained from the camera layout information, the zooming extent, and the environmental object dependent object appearance and movement characteristic information. This value may be a representative value calculated for the entire monitored area or a value calculated for each position in the monitored area.

The image processing performance parameter calculated by the image processing performance parameter calculation unit 101 is output to the camera layout suitability calculation unit 102. The camera layout suitability calculation unit 102 calculates the camera layout suitability based on the image processing characteristic information stored in the image processing characteristic information storage unit 104 for the image processing performance parameter output from the image processing performance parameter calculation unit 101.

Here, the camera layout suitability is a value obtained by indexing the degree indicating how suitable the camera layout represented by the input camera layout information is for the assumed image processing. Specific examples of the camera layout suitability will be described later.

On the other hand, the image processing characteristic information is related to a characteristic of the assumed image processing and describes how the image processing characteristic change with respect to the above-described image processing performance parameter. For example, when the assumed image processing is object detection, the image processing characteristic information is an index indicating the performance such as a detection rate of the object for the values such as the hiding level, resolution, movement, and orientation included in the image processing performance parameter.

The camera layout suitability calculation unit 102 reads the image processing characteristic information for the assumed image processing from the image processing characteristic information storage unit 104, and calculates the camera layout suitability by checking the read image processing characteristic information against the hiding level of the object, the orientation of the object, the direction of the movement of the object, and a value of the speed of the object included in the image processing performance parameter to calculate the camera layout suitability. Details of the method of calculating the camera layout suitability will be described later.

Thus, it is possible to evaluate whether the camera layout is suitable for the assumed image processing in consideration of not only the information of the environmental object placed in the environment but also the appearance and the movement characteristics of the object determined depending on the environmental object. By doing so, the camera layout can be evaluated more appropriately.

Hereinafter, the details of the environmental object dependent object appearance and movement characteristic information, the method of calculating the image processing performance parameter using the environmental object dependent object appearance and movement characteristic information, and the method of calculating the camera layout suitability will be described with reference to specific examples.

Figure 2A:
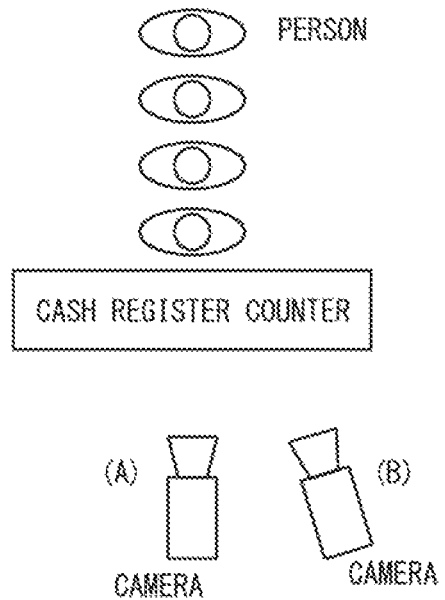
FIG. 2A is a view showing a camera layout example of cameras for capturing persons lining up at a cash register counter.
Figure 2B:
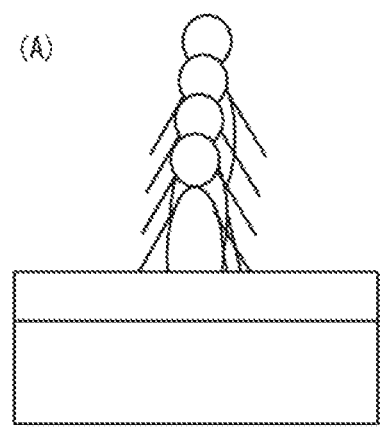
FIG. 2B is a view showing an example of an image assumed when the video is captured with a camera layout (A) of FIG. 2A.
Figure 2C:
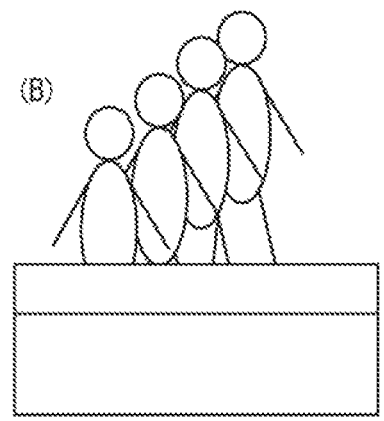
FIG. 2C is a view showing an example of an image assumed when the video is captured with a camera layout (B) of FIG. 2A.

(Specific Example 1) when the Structural Object of the Environmental Object is a Cash Register Counter FIG. 2A shows a camera layout example of the camera for capturing persons lining up at a cash register counter, and is a view seen from directly above. Two types of camera layouts (A) and (B) are shown in FIG. 2A. The camera layout (A) shows a camera layout for capturing persons lining up in front of the cash register counter from the side of the cash register counter, and the camera layout (B) shows a camera layout for capturing the persons lining up at the cash register counter obliquely from the front. FIG. 2B is an example of an image of persons assumed to be captured with the camera layout (A), and FIG. 2C is an example of an image of persons assumed to be captured with the camera layout (B). When the assumed image processing is person detection, the less overlap between persons, the easier it is to detect a person. Therefore, when the assumed image processing is person detection, the camera layout (B) is preferable to the camera layout (A) in the camera layout example of FIG. 2A. Hereinafter, the method of calculating the camera layout suitability in each of the camera layouts (A) and (B) will be described. Here, a case in which the hiding level (spatial hiding ratio) of the object is calculated as the image processing performance parameter to calculate the camera layout suitability is described.

First, the image processing performance parameter calculation unit 101 determines a positional relation between the structural object (in this case, the cash register counter) and the camera in the monitored area as shown in FIG. 2A based on the camera layout information and the environmental object information. Along with this, the image processing performance parameter calculation unit 101 can also determine the position at which customers line up at the time of checkout, and a positional relation between this position and the camera (the distance from the camera to the queue and the angle of the camera with respect to the queue). Note that when the position where the queue is to be formed is specified in advance, the position is included in the environmental object information together with the structural object information, and then input.

Figure 3A:
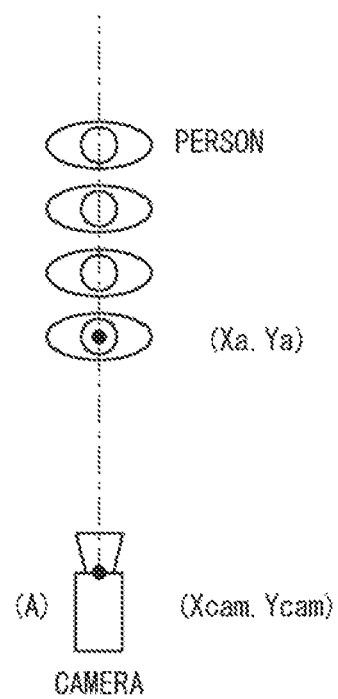
FIG. 3A is a top view of the camera layout (A) of FIG. 2A.
Figure 3B:
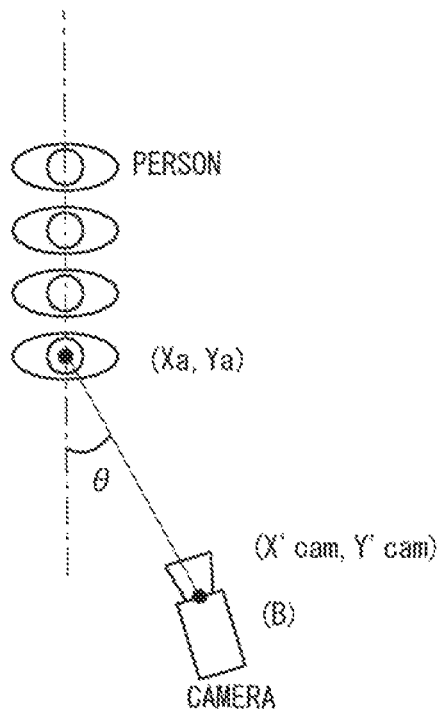
FIG. 3B is a top view of the camera layout (B) of FIG. 2A.
Figure 4:
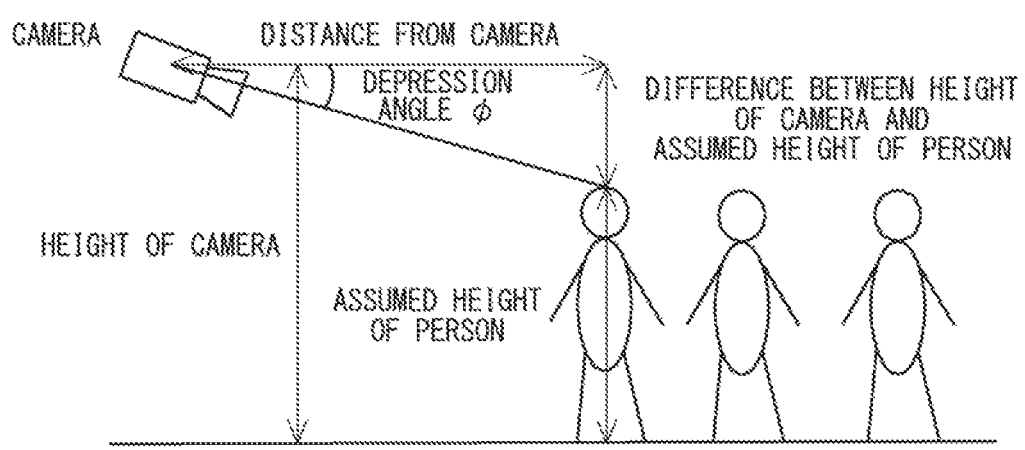
FIG. 4 is a side view of the camera layouts (A) and (B) of FIG. 2A.

FIGS. 3A and 3B show a relation between the position of the camera and the queue position. FIG. 3A is a top view of the positional relation between a queue line (a line indicating the direction in which the queue extends) and the camera with the camera layout (A) of FIG. 2A. When the position of the camera is (Xcam, Ycam), and the position of the head of the queue determined by the position of the cash register counter is (Xa, Ya), the image processing performance parameter calculation unit 101 can obtain a distance between the camera and the head of the queue from a difference between these coordinates. Moreover, since the image processing performance parameter calculation unit 101 can know the queue line from the structural object information, it can obtain an angle between the queue line and a line connecting the camera to the first person in the queue (the angle is hereinafter referred to as a relative azimuth angle with respect to the direction in which the persons line up or simply referred to as a relative azimuth angle). With the camera layout (A), the relative azimuth angle becomes zero in the view seen from above. The way in which the persons overlap with each other in the horizontal direction of the video changes according to the relative azimuth angle, and thus the hiding level also changes. On the other hand, the camera is placed above (usually on a ceiling). As shown in FIG. 4, a depression angle φ with respect to the person at the head of the queue is obtained by a difference between the height of the camera and the assumed height of the person and the distance from the camera to the head of the queue. This depression angle changes the way the person overlaps each other in the vertical direction of the image and changes the hiding level. Thus, the image processing performance parameter calculation unit 101 can calculate the spatial hiding ratio of the persons lining up in the queue by obtaining both the depression angle and the relative azimuth angle.

Likewise, FIG. 3B shows a top view of a positional relation between the queue line and the camera with the camera layout (B) of FIG. 2A. The relative azimuth angle is θ with the camera layout (B). Thus, the image processing performance parameter calculation unit 101 can calculate the spatial hiding level of the persons lining up in the queue by obtaining the relative azimuth angle θ and the depression angle φ.

For example, when a distance between the persons is approximated by d, and a size of the person is approximated by a cylinder having a width W and a height H, the image processing performance parameter calculation unit 101 can approximate a ratio r (D, θ, φ) of the spatial hiding by the following formula (1), where the distance from the camera to the person is D, the depression angle is φ, and the relative azimuth angle is θ.

[Formula 1]

$$r(D,\theta,\varphi)=\min(1,\max(0,1+d\cos\theta/2D-d\sin\theta/W)) \max(0,1-d\cos\theta\tan\varphi/H) \quad (1)$$

The spatial hiding ratio for each D, θ, and φ is calculated and stored in the environmental object dependent object appearance and movement characteristic information storage unit 103 as the environmental object dependent object appearance and movement characteristic information. When the environmental object information includes a structural object such as a cash register counter at which a queue can be formed, the image processing performance parameter calculation unit 101 obtains D, θ, and φ from the environmental object information and the camera layout information, reads the corresponding spatial hiding ratio from the environmental object dependent object appearance and movement characteristic information storage unit 103, and then outputs it as the image processing performance parameter. Alternatively, the image processing performance parameter calculation unit 101 may store the information of d, W, and H used in the Formula (1), and calculate the spatial hiding ratio in accordance with the Formula (1).

In reality, there are variations to some extent in values of the distance d between the persons, and the sizes W and H of the persons. There are also variations in the positions where the persons stand. Thus, the image processing performance parameter calculation unit 101 may consider such variations and treat the spatial hiding ratio as a distribution p (r (D, θ, φ)) instead of treating it as one value determined by D, θ, and φ. In this case, the environmental object dependent object appearance and movement characteristic information storage unit 103 stores values of distribution for each D, θ, and φ. The distribution for each D, θ, and φ is calculated by repeatedly calculating the spatial hiding ratio by varying the values of the distance d between the persons, the sizes W and H of the persons, and the positions where the persons stand within a certain range, and obtaining a frequency distribution. Instead of the distribution, representative values (mean, mode, median, etc.) of the distribution p (r (D, θ, φ)) may be calculated and stored in the environmental object dependent object appearance and movement characteristic information storage unit 103 to be used by the image processing performance parameter calculation unit 101.

Next, a method of calculating the camera layout suitability from the hiding level of the person obtained above will be described. First, a case in which the assumed image processing is person detection will be described.

Figure 5:
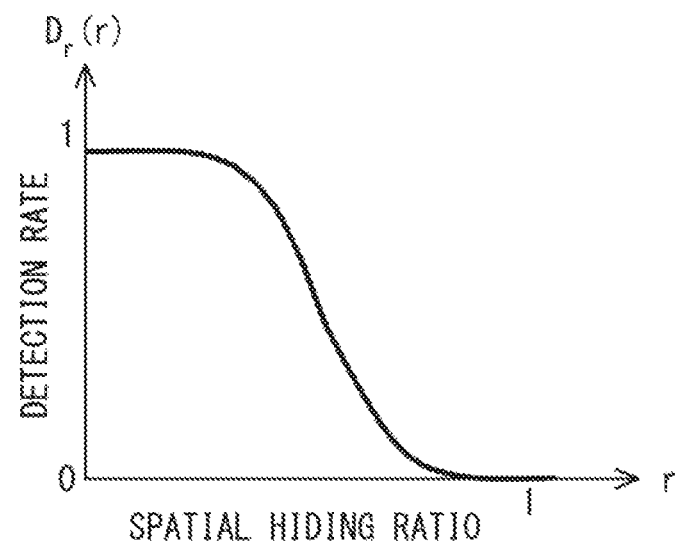
FIG. 5 is a graph showing an example of a relationship between a spatial hiding ratio and a detection rate.

In the case of person detection (object detection in general), commonly, when the spatial hiding ratio is high, detection of a person becomes difficult. This characteristic varies depending on the person detection method used. Therefore, a relationship Dr(r) between the hiding level r and the detection rate indicating how much detection can be achieved at a certain hiding level is calculated, and Dr(r) is stored in the image processing characteristic information storage unit 104 as the image processing characteristic information. For example, the relationship between the spatial hiding ratio and the detection rate is as shown in the graph of FIG. 5. Therefore, a value of the graph for each r may be calculated (or actual measurement may be taken), and this value may be stored in the image processing characteristic information storage unit 104 as the image processing characteristic information. Then, the camera layout suitability calculation unit 102 obtains an assumed detection rate based on the image processing characteristic information from the hiding level obtained above.

The camera layout suitability calculation unit 102 can define camera layout suitability ρ as a monotonic non-decreasing function ρ(Dr(r)) of the detection rate Dr(r) obtained above. Alternatively, the camera layout suitability calculation unit 102 may calculate the detection rate Dr (r) as it is as the camera layout suitability p.

With the camera layout example of FIG. 2A, the spatial hiding ratio is lower with the camera layout (B) than it is with the camera layout (A), and thus the detection rate of the person detection with the camera layout (B) is higher than that with the camera layout (A), and the camera layout suitability of the camera layout (B) is also higher than that of the camera layout (A).

When the hiding level is expressed as a distribution p(r), the camera layout suitability calculation unit 102 calculates the camera layout suitability ρ based on the detection rate Dr(r) in accordance with the Formula (2).

[Formula 2]

$$\rho=\int D_r(r)p(r)dr \quad (2)$$

An example in which the camera layout suitability is obtained using the spatial hiding ratio as the image processing performance parameter has been described. On the other hand, the detection rate varies depending not only on the hiding level but also on the size of the object itself (resolution on the image). Thus, the image processing performance parameter calculation unit 101 may obtain the resolution of an object projected by the camera from the camera layout information and the environmental object information, and the camera layout suitability calculation unit 102 may use the resolution determined by the image processing performance parameter calculation unit 101 to calculate the camera layout suitability. The method according to related art (e.g., the method described in Patent Literature 1) may be used for this calculation. At this time, the camera layout suitability calculation unit 102 may calculate the overall camera layout suitability, for example, by multiplying the camera layout suitability obtained based on the spatial hiding ratio by the camera layout suitability obtained based on the resolution. Alternatively, as the image processing characteristic information, the detection rate for the spatial hiding ratio is obtained for each resolution of the object and stored in the image processing characteristic information storage unit 104. The camera layout suitability calculation unit 102 may read the detection rate corresponding to the resolution obtained by the image processing performance parameter calculation unit 101, so that the detection rate is switched according to the resolution.

The coverage indicating a range that can be covered by the camera may also be an important factor in determining the camera layout suitability. Therefore, the image processing performance parameter calculation unit 101 may also calculate the coverage as the image processing performance parameter, and the camera layout suitability calculation unit 102 may calculate the camera layout suitability by multiplying the camera layout suitability value by the coverage.

Although the camera layout suitability has been obtained as a single value so far, in practice, the value such as the hiding level differs from place to place. For example, in the example of the queue described above, the distance between the camera and the head of the queue and the angle of the camera at the head of the queue differs from those at the end of the queue, and thus the hiding level at the head of the queue differs from that at the end of the queue. Additionally, there may be a plurality of cash register counters instead of one. Therefore, the camera layout suitability calculation unit 102 may calculate the camera layout suitability ρ(X, Y) for each position (X, Y) of the monitored area.

Further, a plurality of cameras may be placed in the monitored area. In this case, the camera layout suitability calculation unit 102 may calculate the camera layout suitability for each camera, and integrate the calculated camera layout suitability to calculate the overall camera layout suitability. In this case, the visual fields of the plurality of cameras may overlap each other. In this case, at a position where the visual fields of the plurality of cameras overlap each other, the camera layout suitability calculation unit 102 may employ the largest camera layout suitability among the camera layout suitability calculated for the camera layout information of the cameras whose visual fields includes the area of the position.

Next, a case in which the assumed image processing is person tracking will be described. There are various methods of tracking a person. In this example, a method of tracking a person by associating results of person detection between frames will be described.

In the case of person tracking, in addition to the performance of person detection, it is important to consider how accurately the same person can be associated with himself/herself between frames. More specifically, when erroneous detection or non-detection occurs in the unit of a frame, it is important to correctly associate the same person without being affected by erroneous detection or non-detection. At this time, in the event of a person being hidden for a long time due to overlapping of persons, this person continues to be undetected during that time, so that discontinuity or erroneous association is likely to occur between frames. Therefore, as the hiding level of the image processing performance parameter, not only the spatial hiding ratio but also a temporal hiding level are considered.

Figure 6:
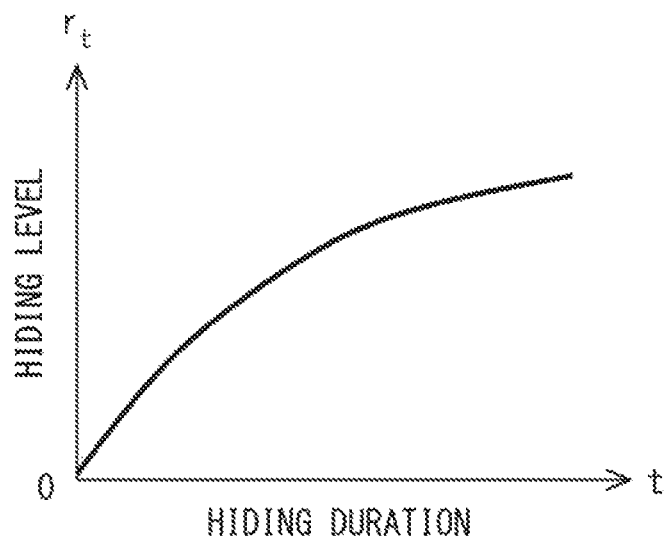
FIG. 6 is a graph showing an example of a relationship between a hiding duration and a temporal hiding level.

Here, the image processing performance parameter calculation unit 101 can define the temporal hiding level by the duration of hiding (time during which the hiding lasts). That is, the image processing performance parameter calculation unit 101 regards that the longer the duration of hiding is, the larger the temporal hiding level becomes, and for example, can numerically express the temporal hiding level as a monotonic non-decreasing function of the duration of hiding, as shown in FIG. 6. As for the duration of hiding, the time that the queue continues to stay can be obtained from the average time required for customer service at the cash register counter. Hence, the image processing performance parameter calculation unit 101 can determine the duration of hiding (which is typically equal to the time during which the queue is stopped) based on the time during which the queue continues to stay.

Alternatively, like in the case of the spatial hiding ratio, the image processing performance parameter calculation unit 101 may obtain the distribution of the hiding duration, and use this distribution as the hiding level of the image processing performance parameter. Alternatively, the image processing performance parameter calculation unit 101 may calculate and use a representative value of the distribution (average, mode, median, etc.). The image processing performance parameter calculation unit 101 may include the representative value of the distribution in the hiding ratio information together with the information of the spatial hiding level.

On the other hand, the image processing characteristic information storage unit 104 stores the relationship between the temporal hiding level and a tracking success rate as the image processing characteristic information. When the image processing performance parameter calculation unit 101 obtains the temporal hiding level as the image processing performance parameter from the environmental object dependent object appearance and movement characteristic information, the camera layout suitability calculation unit 102 obtains the tracking success rate corresponding to the temporal hiding level from the image processing characteristic information, and uses the tracking success rate for calculation of the camera layout suitability. Also in this case, the camera layout suitability calculation unit 102 may define the camera layout suitability by a monotonic non-decreasing function of the tracking success rate. In this case as well, the camera layout suitability calculation unit 102 may obtain the camera layout suitability in consideration of the resolution of the object like in a manner similar to the person detection.

Next, a case in which the assumed image processing is person authentication will be described.

In the case of person authentication, not only the hiding level described above, but also information about the orientation of the person may be important in some cases. For example, in the case of person authentication using face authentication, the accuracy of verification is higher when the person's face is captured from an angle close to the front, and the accuracy of verification tends to be lower when the person's face is captured obliquely or from the side. For this reason, the camera layout suitability is calculated in consideration of the orientation of the person.

In this case, the image processing performance parameter calculation unit 101 obtains not only the hiding level but also orientation information of the person (objects in general) from the environmental object dependent object appearance and movement characteristic information as the image processing performance parameter. When people line up in a queue, they often face forward. Since the orientation of the person can be determined by the above-described relative azimuth angle, the image processing performance parameter calculation unit 101 may obtain the angle indicated by the relative azimuth angle as the orientation information of the person. The person may not be always facing forward, but may be facing in other directions when he/she stops. In addition, the orientation of the person may be changed not only in the horizontal direction but also in the vertical direction such as when he/she looks down. Thus, frequency distribution information for each orientation may be obtained based on the orientation of the queue, and this frequency distribution information may be included in the environmental object dependent object appearance and movement characteristic information and stored in the environmental object dependent object appearance and movement characteristic information storage unit 103. Then, the image processing performance parameter calculation unit 101 converts the distribution so that the orientation of the front of the camera becomes a reference according to the relative azimuth angle obtained from the camera layout information and the environmental object information, and outputs the converted distribution as the image processing performance parameter.

On the other hand, the image processing characteristic information storage unit 104 stores information about a verification rate of the person for each orientation as the image processing characteristic information. Then, the camera layout suitability calculation unit 102 obtains the verification rate corresponding to the value of the image processing performance parameter obtained by the image processing performance parameter calculation unit 101, and uses the verification rate for calculation of the camera layout suitability. Also in this case, the camera layout suitability calculation unit 102 can define the camera layout suitability by a monotonic non-decreasing function for the verification rate. In this case as well, the camera layout suitability calculation unit 102 may obtain the camera layout suitability in consideration of the resolution of the object in a manner similar to the case of the person detection.

In this manner, it is possible to calculate the camera layout suitability when a structural object such as a cash register counter where a queue is formed is included in the environmental object. In the first specific example 1, although an example of a cash register counter has been described, any structural object may be applicable as long as a queue is formed (or a queue is triggered) in the structural object. For example, the specific example 1 can be applied to, for example, a queue in front of an ATM (Automatic Teller Machine), a queue in front of an immigration counter at an airport, and a queue in front of a ticket machine of a station in a manner similar to the example described above.

Figure 7A:
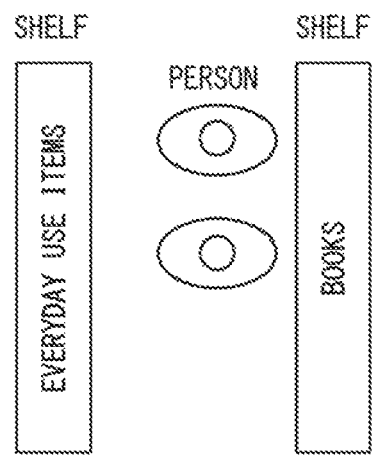
FIG. 7A is a view showing a camera layout example of cameras for capturing persons before a fixture.
Figure 7A:
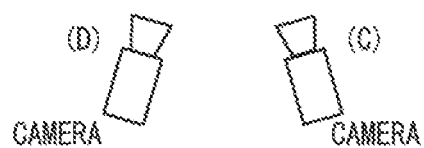
Figure 7B:
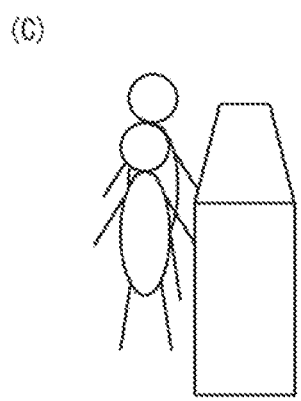
FIG. 7B is a view showing an example of an image assumed when the image is captured with a camera layout (C) of FIG. 7A.
Figure 7C:
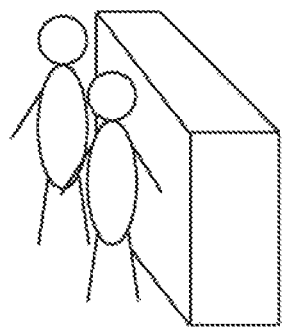
FIG. 7C is a view showing an example of an image assumed when the image is captured with a camera layout (D) of FIG. 7A.

(Specific Example 2) when the Structural Object of the Environmental Object is a Fixture (Shelf) and the Placed Objects are Items FIG. 7A shows a camera layout example of the camera for capturing persons in the vicinity of a commodity shelf, and is a view seen from directly above. Here, in addition to a shelf as a structural object, items (in this case, book and everyday use items) which are placed objects placed on the structural object are also presented. Also in this FIG. 7A, two types of camera layouts (C) and (D) are shown. The camera layout (C) shows a camera layout for capturing a video from a position closer to the shelf where the books are placed, and the camera layout (D) is a camera layout for capturing a video from a position closer to a shelf where everyday use items are arranged. FIG. 7B is an example of a video of persons assumed to be captured with the camera layout (C), and FIG. 7C is an example of a video of persons assumed to be captured with the camera layout (D). FIGS. 7B and 7C show how the situation where two persons staying side by side in front of the shelf where the books is captured (in FIGS. 7B and 7C, the shelf where the everyday use items are placed are not shown). Considering that shoppers are likely to stay in front of book shelves compared with shelves for everyday use items, the situation of a person staying on the book shelve side is likely to occur, as in FIGS. 7B and 7C. Therefore, when the assumed image processing is person detection, in the example of the camera layout of FIG. 7A, it can be said that the camera layout (D) is preferable to the camera layout (C). In the following descriptions, a method of calculating the camera layout suitability in each case of the camera layout (C) and (D) will be described.

The image processing performance parameter calculation unit 101 determines, from the camera layout information and the environmental object information, a positional relation between the structural object in the monitored area and placed objects (in this case, the shelf and the items) and the camera in the monitored area as shown in FIG. 7A. Then, the image processing performance parameter calculation unit 101 can determine a position where persons are likely to stay, and like in the specific example 1, determine the positional relation between this position and the camera (a distance from the camera to the person or an angle of the camera with respect to a direction in which the staying person lines up). Thus, like in the specific example 1, the image processing performance parameter calculation unit 101 can obtain the relative azimuth angle and the depression angle with respect to the direction in which the staying person lines up.

Next, the image processing performance parameter calculation unit 101 obtains the hiding level for the depression angle and the relative azimuth angle obtained as above from the environmental object dependent object appearance and movement characteristic information as the image processing performance parameter. At this time, information about the hiding level calculated in the same manner as in the first specific example is stored in the environmental object dependent object appearance and movement characteristic information storage unit 103 as the environmental object dependent object appearance and movement characteristic information for each kind of the placed object of the shelf. This hiding level can be calculated in the same manner as in the specific example 1, although the value of the parameter such as the distance between persons and hiding duration differs from that for the queue in the specific example 1. The hiding level varies depending on the type of items placed on the shelf. For this reason, the information about the hiding level for each placed object placed on the shelf is stored in the environmental object dependent object appearance and movement characteristic information storage unit 103, and the image processing performance parameter calculation unit 101 uses the corresponding hiding level information according to the information of the placed object included in the input environmental object information. In this example, although the hiding level is not calculated for the everyday use items, the image processing performance parameter calculation unit 101 may also calculate the hiding level for the everyday use items in the same manner as for the book. In this case, the image processing performance parameter calculation unit 101 calculates the hiding level for each shelf (for each placed object). However, when the staying state of a certain shelf is negligibly low, the hiding level for the shelf may not be calculated.

Next, the camera layout suitability calculation unit 102 calculates the camera layout suitability from the image processing performance parameter obtained by the image processing performance parameter calculation unit 101 using the image processing characteristic information. The calculation of the camera layout suitability is basically the same as in the specific example 1. The camera layout suitability calculation unit 102 calculates the camera layout suitability corresponding to the assumed image processing based on the information of the hiding level, the orientation of the person, and the resolution.

Figure 8A:
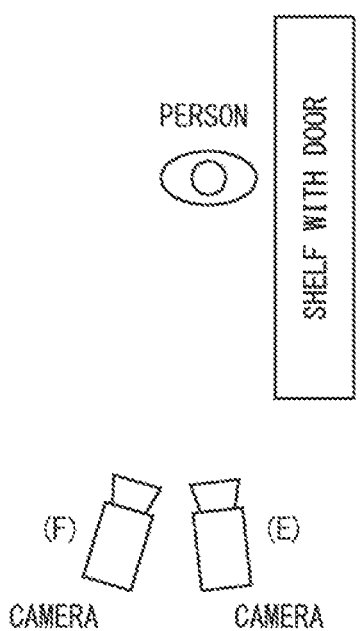
FIG. 8A is a view showing a camera layout example of cameras for capturing a person in front of a shelf with a door.
Figure 8B:
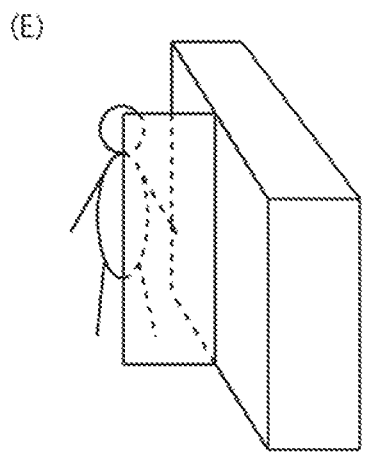
FIG. 8B is a view showing an example of an image assumed when the image is captured with a camera layout (E) of FIG. 8A.
Figure 8C:
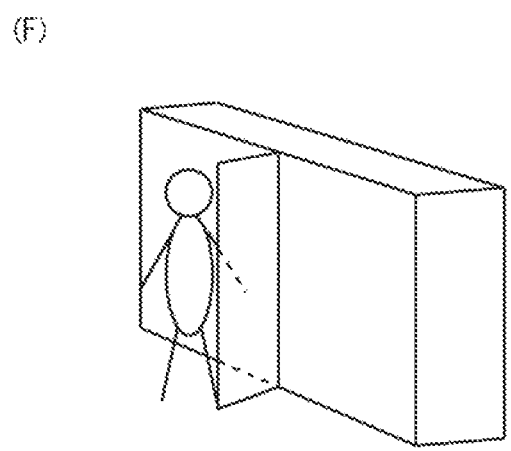
FIG. 8C is a view showing an example of an image assumed when the image is captured with a camera layout (F) of FIG. 8A.

(Specific Example 3) when the Structural Object of the Environmental Object is a Fixture with a Door FIG. 8A shows a camera layout example of a camera for capturing a person near a commodity shelf with a door such as a drink shelf or a frozen food shelf (hereinafter referred to as a shelf with a door), and is a view seen from right above. Also in FIG. 8A, two camera layouts (E) and (F) are shown. The camera layout (E) indicates a camera layout for capturing a shelf with a door almost from the side, and the camera layout (F) indicates a camera layout for capturing the shelf with a door obliquely. FIG. 8B is an example of an image of a person assumed to be captured with the camera layout (E), and FIG. 8C is an example of an image of a person assumed to be captured with the camera layout (F). FIGS. 8B and 8C show how a person is captured when a door of the shelf with a door is opened. With the camera layout (E), the hiding level of the person hidden by the door (ratio of an area of the hidden region to that of the entire region) is increased, while with the camera layout (F), the hiding level of the person hidden by the door is not increased as much as the camera layout (E). Therefore, when the assumed image processing is person detection, in the example of the camera layout of FIG. 8A, it can be said that the camera layout (F) is preferable to the camera layout (E). Hereinafter, a method of calculating the camera layout suitability in each of the camera layout (E) and (F) will be described.

First, the image processing performance parameter calculation unit 101 determines, from the camera layout information and the environmental object information, a positional relation between the structural object in the monitored area (in this case, the shelf with the door) and the camera in the monitored area as shown in FIG. 8A. Therefore, the image processing performance parameter calculation unit 101 can determine the relationship between the camera and the position where the person is assumed to stand in front of the shelf with the door.

Figure 9A:
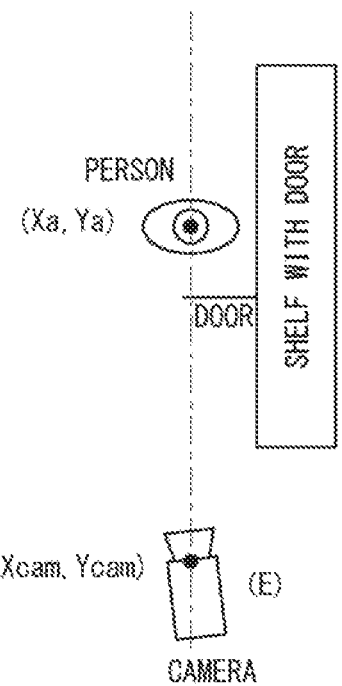
FIG. 9A is a top view of the camera layout (E) of FIG. 8A.
Figure 9B:
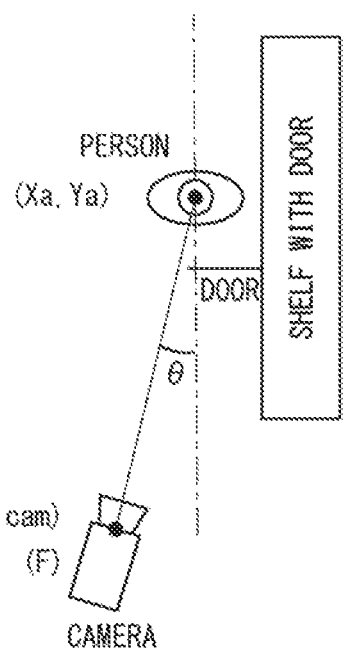
FIG. 9B is a top view of the camera layout (F) of FIG. 8A.

FIGS. 9A and 9B show a relationship between the position of the camera and the position of the person standing in front of the shelf with a door. FIG. 9A is a top view of the positional relation with the camera layout (E) of FIG. 8A. Here, assuming that the position of the camera is (Xcam, Ycam) and the position of the person is (Xa, Ya), the image processing performance parameter calculation unit 101 can obtain a distance between the camera and the person from a difference between the coordinates of the position of the camera and those of the person, and can also obtain an angle formed by the line connecting the camera to the person and the front surface of the shelf. This angle is referred to as a relative azimuth angle for the shelf. With the camera layout (E), the relative azimuth angle becomes 0. The hiding level of the person hidden by the door of the shelf in the image is changed in the horizontal direction by the relative azimuth angle. Further, the hiding level of the person hidden by the door of the shelf in the image in the vertical direction is changed by a depression angle of the camera and a height of the shelf. Therefore, also in this case, the image processing performance parameter calculation unit 101 can calculate the hiding level (in this example, the spatial hiding ratio) of the person by obtaining both the depression angle and the relative azimuth angle.

Likewise, FIG. 9B shows the relationship between the position of the camera and the position of the person standing in front of the shelf with the door with the camera layout (F) of FIG. 8A as viewed from above. With the camera layout (F), the relative azimuth angle becomes θ. Therefore, the image processing performance parameter calculation unit 101 can calculate the hiding level of the person by obtaining the relative azimuth angle θ and the depression angle φ.

Thus, also in this case, the hiding ratio for each value of the relative azimuth angle θ and the depression angle φ is calculated and stored in the environmental object dependent object appearance and movement characteristic information storage unit 103 as the environmental object dependent object appearance and movement characteristic information. The image processing performance parameter calculation unit 101 may obtain the values of θ and φ based on the camera layout information and the environmental object information, read out the corresponding hiding ratio from the environmental object dependent object appearance and movement characteristic information storage unit 103, and output it as the image processing performance parameter.

When the door is opened, the angle formed by the door and the shelf is not always constant and varies to some extent. There are also variations in the positions where the person stands in front of shelves. The hiding level changes according to the angle of the door and the position where the person stands. Therefore, the image processing performance parameter calculation unit 101 may calculate the hiding level as the image processing performance parameter in consideration of the distribution of the angle of the door and the distribution of the position where the person stands.

The method of calculating the hiding level by the image processing performance parameter calculation unit 101 and then calculating the camera layout suitability by the camera layout suitability calculation unit 102 is the same as that in the above specific examples. For example, in the case of person detection, in the example of FIG. 8A, the camera layout suitability for the camera layout (F) in which the hiding level is low is higher than that for the camera layout (E).

As the hiding level, the image processing performance parameter calculation unit 101 may consider the duration of hiding in a manner similar to the case described above. In particular, when the assumed image processing is tracking, the image processing performance parameter calculation unit 101 may include the duration of hiding in the hiding level for consideration and calculate the camera layout suitability in the same manner as described above. In this case, the image processing performance parameter calculation unit 101 may also treat the duration of hiding as a distribution in consideration of the variation.

Figure 10A:
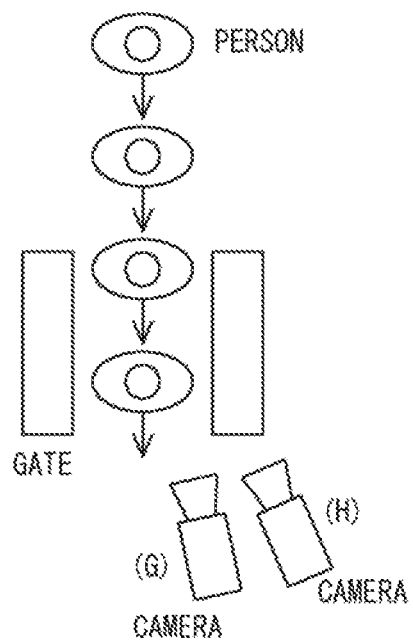
FIG. 10A is a view showing a camera layout example of cameras for capturing persons passing through a gate.
Figure 10B:
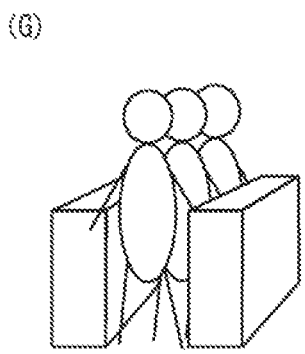
FIG. 10B is a view showing an example of an image assumed when the image is captured with a camera layout (G) of FIG. 10A.

(Specific Example 4) When the structural object of the environmental object is gate FIG. 10A shows a camera layout example of the camera for capturing the vicinity of a gate, and is a view seen from right above. Here, a partition of the gate is shown as a structural object. Also in FIG. 10A, two camera layouts (G) and (H) are shown. The camera layout (G) indicates a camera layout for capturing persons passing through the gate from slightly obliquely with respect to the gate, and the camera layout (H) indicates a camera layout for capturing persons passing through the gate more obliquely with respect to the front of the gate. Note that in FIG. 10A, the white circles indicate persons, and the arrows indicate moving directions of the persons. FIG. 10B is an example of an image of persons assumed to be captured with the camera layout (G), and FIG. 10C is an example of an image of persons assumed to be captured with the camera layout (H).

Figure 10C:
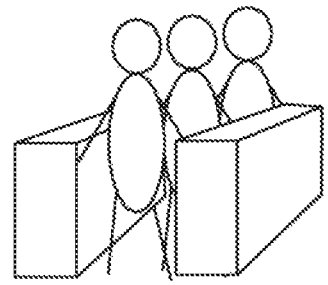
FIG. 10C is a view showing an example of an image assumed when the image is captured with a camera layout (H) of FIG. 10A.

FIGS. 10B and 10C show how the persons coming one after another and are captured as they pass through the gate. With the camera layout (G), while the persons can be captured from an angle close to the front, when the distance from the following person is shortened, the persons overlap each other and the hiding occurs. On the other hand, with the camera layout (H), although the persons are captured more obliquely, it can be seen that the persons are less likely to overlap each other even when the distance between the persons is shortened. Therefore, when the assumed image processing is, for example, person authentication by a face, the robustness of non-frontality or hiding differs depending on the authentication method used, and the trade-off between the non-frontality and hiding determines which camera layout is better. Hereinafter, a method of calculating the camera layout suitability in each of the camera layout (G) and (H) will be described.

First, the image processing performance parameter calculation unit 101 can determine, from the camera layout information and the environmental object information, an angle (relative azimuth angle with respect to the direction in which the person travels) formed by a line connecting the direction in which the persons proceed in line at the gate to the position of the person whose face is authenticated by the camera, in a manner similar to the case of the queue of the first specific example, and can also determine the depression angle.

Next, the image processing performance parameter calculation unit 101 obtains the hiding level for the depression angle and the relative azimuth angle obtained as above from the environmental object dependent object appearance and movement characteristic information as the image processing performance parameter. The hiding level varies according to the assumed distance between the persons. Thus, the assumed distance d may be set in the image processing performance parameter calculation unit 101, and the image processing performance parameter calculation unit 101 may calculate the hiding level. Instead of directly designating the assumed distance to the image processing performance parameter calculation unit 101, the image processing performance parameter calculation unit 101 may calculate the assumed distance in accordance with the Formula (3) from the assumed number of persons passing through the gate n per unit time and a speed v during passage.

[Formula 3]

$$d = \frac{v}{n}. \quad (3)$$

At the same time, the image processing performance parameter calculation unit 101 also calculates information about the orientation of the face at the position where face authentication is performed. Usually, it is considered that the person walks facing the direction in which he/she travels, and thus the orientation of the face matches the relative azimuth angle. However, it is also considered that sometimes the person walks while facing sideways. It is also considered that the person sometimes walks with his/her head down. For this reason, the image processing performance parameter calculation unit 101 may calculate the distribution for each angle in consideration of not only the orientation of the face in the horizontal direction but also the orientation of the face in the vertical direction. Furthermore, since the resolution of the face area can also be an important factor, the image processing performance parameter calculation unit 101 may also determine the resolution.

Figure 11:
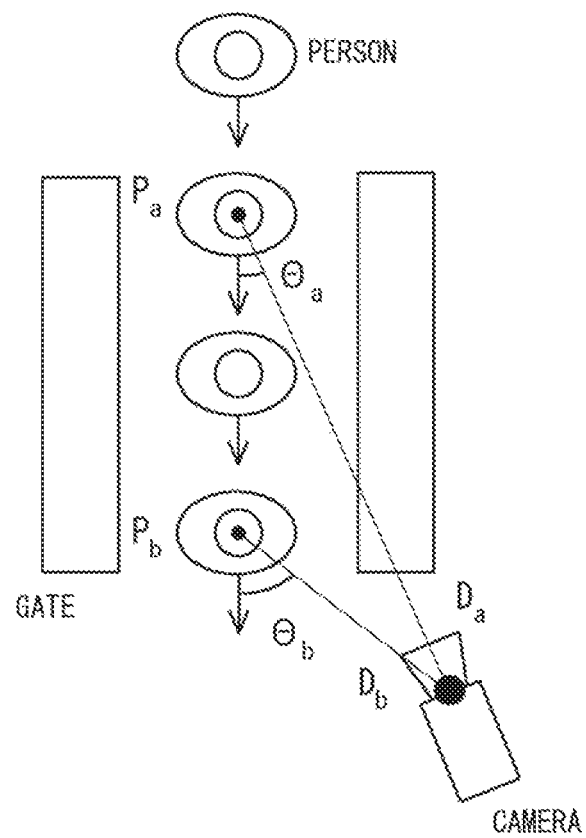
FIG. 11 shows an example of a relationship between positions of persons and positions of cameras when face authentication is performed at a plurality of positions of a gate.

Furthermore, it can be considered that the face authentication is performed not at one location and instead the face authentication is performed while the person is present within a certain range in the gate. For example, if face authentication can be performed between the position of Pa and the position of Pb in FIG. 11, the hiding level, the orientation of the face, and the resolution vary depending on the relative azimuth angle (θa for Pa, θb for Pb) at that location. They vary also depending on the resolution. Thus, the image processing performance parameter calculation unit 101 may calculate and use the image processing performance parameter for each position (X, Y) where the face authentication is possible in the gate.

Next, the camera layout suitability calculation unit 102 calculates the camera layout suitability using the image processing characteristic information. In this case, the image processing characteristic information storage unit 104 stores information about each hiding level, each orientation of face, and the verification rate of the person for the resolution as the image processing characteristic information. The camera layout suitability calculation unit 102 obtains a corresponding verification rate based on the image processing performance parameter obtained by the image processing performance parameter calculation unit 101, and uses the verification rate for calculation of the camera layout suitability. In this case, the camera layout suitability calculation unit 102 can define the camera layout suitability by a monotonic non-decreasing function for the verification rate.

Although the case in which the object is a person has been described, the above description applies to the case in which the object is a vehicle. For example, in the case of a vehicle, a license plate is recognized to identify an individual vehicle. Therefore, when the object is a vehicle, the face described above may be replaced with a license plate. In this case, the camera layout suitability calculation unit 102 obtains the hiding level of the license plate, the orientation of the license plate, and the resolution as the image processing performance parameters. The camera layout suitability can be calculated based on the image processing characteristic information describing the characteristic of the number reading system.

(Specific Example 5) when the Situation Changes Depending on the Time of Day

A method of calculating the camera layout suitability on the assumption that the environmental object information does not change depending on the time of day has been described so far. However, the situation of the structural object changes depending on the time of day at some places. For example, when the structural object is crowded during the day, an extra cash register is provided to handle the congestion. In such a case, the camera layout suitability calculation unit 102 may calculate the camera layout suitability according to the situations of the respective structural objects or placed objects that change depending on the time of day, and calculate the camera layout suitability by integrating the calculated camera layout suitability.

In this case, as a method of integrating the camera layout suitability, the camera layout suitability calculation unit 102 may use a method of calculating a weighted average by weighting the camera layout suitability in accordance with a ratio of time. Alternatively, as a method of integrating the camera layout suitability, the camera layout suitability calculation unit 102 may use a method of weighting the camera layout suitability according to a rate of the number of persons (number of objects) assumed to be projected by the camera during the time of day.

When the field of view of the camera can be automatically controlled, the orientation and zoom rate of the camera may be changed depending on the time of day, in a manner similar to the case of a PTZ (Pan Tilt Zoom) camera. In this case, the camera layout suitability calculation unit 102 may calculate the camera layout suitability when only the orientation of the camera or the zoom rate is changed without changing the position of the camera according to the environmental object information for each time of the day, and integrate the camera suitability calculated for each time of day as described above to calculate the overall camera layout suitability.

Next, an optimum camera layout calculation apparatus for calculating an optimum camera layout by using the above-described camera layout suitability evaluation apparatus 100 will be described.

Figure 12:
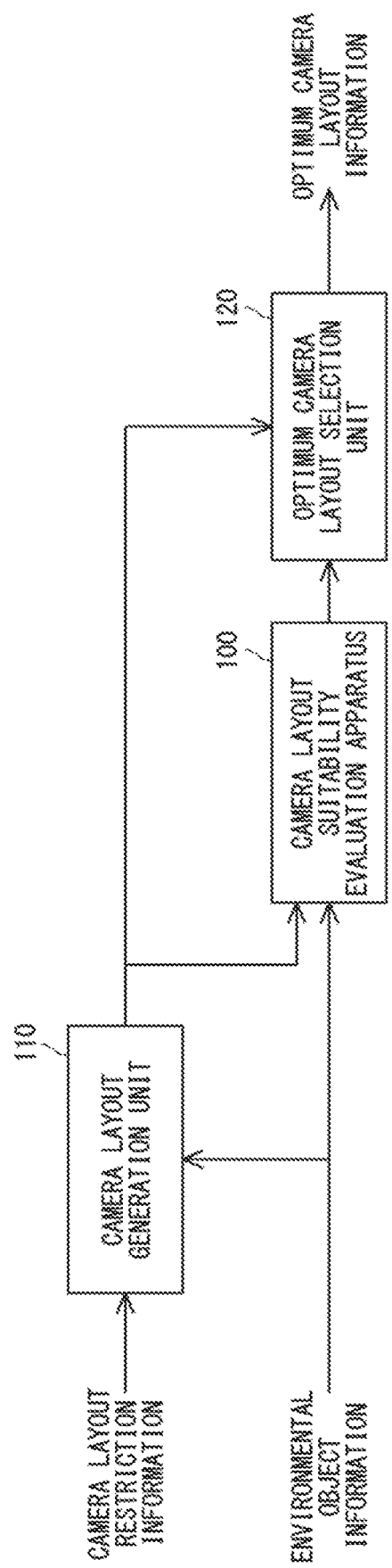
FIG. 12 is a block diagram showing a configuration example of an optimum camera layout calculation apparatus according to an example embodiment of the present disclosure.

FIG. 12 shows a configuration example of an optimum camera layout calculation apparatus according to the example embodiment of the present disclosure. The optimum camera layout calculation apparatus includes a camera layout generation unit 110, a camera layout suitability evaluation apparatus 100, and an optimum camera layout selection unit 120.

The camera layout generation unit 110 receives camera layout restriction information and the environmental object information, generates a plurality of pieces of camera layout information, and outputs the generated plurality of pieces of camera layout information to the camera layout suitability evaluation apparatus 100.

The plurality of pieces of camera layout information and environmental object information output from the camera layout generation unit 110 are input to the camera layout suitability evaluation apparatus 100, and the camera layout suitability is calculated for each camera layout represented by the camera layout information.

The optimum camera layout selection unit 120 receives the plurality of camera layout suitability output from the camera layout suitability evaluation apparatus 100 and the plurality of pieces of the camera layout information output from the camera layout generation unit 110, selects the camera layout information having the largest camera layout suitability from among the plurality of pieces of camera layout information, and outputs the selected camera layout information as the optimum camera layout information.

Next, an operation of the optimum camera calculation apparatus shown in FIG. 12 will be described.

The camera layout restriction information and environmental object information are input to the camera layout generation unit 110. The camera layout restriction information indicates restrictions on a camera layout, and is, for example, information such as a place where a camera can be installed (a place where power can be supplied or camera fixing equipment can be installed) and the maximum number of cameras placed. Alternatively, a place where the camera cannot be installed may be included in the camera layout restriction information.

The camera layout generation unit 110 generates a plurality of pieces of camera layout information satisfying the restriction conditions included in the input camera layout restriction information. As a method of generating the camera layout information, any known method may be used. For example, the camera layout generation unit 110 may place possible points for placing a camera satisfying the restrictions on the camera layout at regular intervals, select the points corresponding to the designated number of cameras from among the possible points for placing a camera, add the information about the pose that the camera can take to the selected camera layout, and then output them as the camera layout information. Alternatively, the camera layout generation unit 110 may randomly place a predetermined number of cameras satisfying a predetermined condition and output the camera layout of the cameras as the camera layout information. The plurality of pieces of camera layout information generated by the camera layout generation unit 110 are input to the camera layout suitability evaluation apparatus 100.

The operation of the camera layout suitability evaluation apparatus 100 is the same as that of the camera layout suitability evaluation apparatus 100 shown in FIG. 1. The camera layout suitability evaluation apparatus 100 calculates the camera layout suitability for each piece of the plurality of pieces of the input camera layout information, and outputs the calculated plurality of camera layout suitability.

The plurality of camera layout suitability output from the camera layout suitability evaluation apparatus 100 are input to the optimum camera layout selection unit 120. The plurality of pieces of camera layout information corresponding to the plurality of camera layout suitability are also input to the optimum camera layout selection unit 120. The optimum camera layout selection unit 120 selects camera layout information having the largest camera layout suitability from among the plurality of pieces of camera layout information, and outputs the selected camera layout information as the optimum camera layout information.

With this configuration, the optimum camera layout among the camera layouts satisfying the specific restriction can be automatically calculated.

As described above, according to this example embodiment, the camera layout suitability evaluation apparatus 100 calculates, for camera layout information representing at least a position, a pose, and an angle of view of the camera placed in the monitored area and environmental object information representing an environmental object including a structural object present in the monitored area and a placed object placed in this structural object, an image processing performance parameter indicating at least one of a hiding level of an object, an orientation of the object, and a movement of the object based on characteristic information representing characteristics of an appearance and a movement of the object determined depending on an environmental object. Further, the camera layout suitability evaluation apparatus 100 calculates camera layout suitability based on image processing characteristic information representing a characteristic of the image processing for the image processing performance parameter, the camera layout suitability being obtained by indexing a level of suitability of a camera layout represented by the camera layout information for the image processing of the object.

As described above, according to this example embodiment, the camera layout suitability evaluation apparatus 100 calculates the camera layout suitability by considering not only the static information of the environmental object in the monitored area but also the characteristic information representing the appearance characteristic and the movement characteristic of the object determined depending on the environmental object. Therefore, it is possible to more appropriately evaluate whether the camera layout is suitable for image processing on the object even under a situation where the objects overlap each other or a situation where the structural object has a movable part according to the appearance characteristic and the movement characteristic of the object determined depending on the environmental object.

Further, in the above example embodiments, each element shown in the drawings as functional blocks that perform various processing can be formed of a CPU (Central Processing Unit), a memory, and other circuits in hardware and may be implemented by programs loaded into the memory in software. Those skilled in the art will therefore understand that these functional blocks may be implemented in various ways by only hardware, only software, or the combination thereof without any limitation.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the embodiments, the present disclosure is not limited to these embodiments. Various changes that can be understood by those skilled in the art within the scope of the present disclosure can be made to the configurations and the details of the present disclosure.

The whole or part of the embodiments disclosed above can be described as, but not limited to, the following supplementary notes.

(Supplementary Note 1)

A camera layout suitability evaluation apparatus for evaluating whether a layout of a camera placed in a monitored area is suitable for image processing on an object projected in an image captured by the camera, the camera layout suitability evaluation apparatus comprising:

an image processing performance parameter calculation unit configured to calculate, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and a camera layout suitability calculation unit configured to calculate camera layout suitability based on image processing characteristic information representing a characteristic of the image processing for the image processing performance parameter, the camera layout suitability being obtained by indexing a level of suitability of a camera layout represented by the camera layout information for the image processing of the object.

(Supplementary Note 2)

The camera layout suitability evaluation apparatus according to Supplementary note 1, wherein the hiding level of the object is determined based on overlapping of the objects determined according to characteristics of the structural object and the placed object or according to a ratio of an area of a hidden region of the object hidden by a movable part of the structural object to an area of an entire region of the object.

(Supplementary Note 3)

The camera layout suitability evaluation apparatus according to Supplementary note 1, wherein the hiding level of the object is defined by a duration which is a time for which a hidden state of the object continues.

(Supplementary Note 4)

The camera layout suitability evaluation apparatus according to any one of Supplementary notes 1 to 3, wherein the hiding level of the object, the orientation of the object, and the movement of the object are represented by a probabilistic distribution.

(Supplementary Note 5)

The camera layout suitability evaluation apparatus according to any one of Supplementary notes 1 to 4, wherein the image processing performance parameter calculation unit is configured to calculate the image processing performance parameter for each position in the monitored area, and the camera layout suitability calculation unit is configured to calculate, for each position in the monitored area, the camera layout suitability using the image processing performance parameter calculated for the corresponding position.

(Supplementary Note 6)

The camera layout suitability evaluation apparatus according to Supplementary note 5, wherein the camera layout information includes a plurality of pieces of the camera layout information of a plurality of the cameras, respectively, the image processing performance parameter calculation unit is configured to calculate, for each of the plurality of pieces of the camera layout information, the image processing performance parameter for each position in the monitored area, the camera layout suitability calculation unit is configured to calculate, for each of the plurality of pieces of the camera layout information, the camera layout suitability for each position in the monitored area using the image processing performance parameter calculated for the corresponding camera layout information and for the corresponding position, and at a position where visual fields of the plurality of the cameras overlap each other, the largest camera layout suitability from among the camera layout suitabilities calculated for the plurality of pieces of the camera layout information for the plurality of cameras is used as the camera layout suitability at the corresponding position.

(Supplementary Note 7)

The camera layout suitability evaluation apparatus according to any one of Supplementary notes 1 to 6, wherein the environmental object information includes information changing according to a time of day, and the camera layout suitability calculation unit is configured to calculate the camera layout suitability for each time of day.

(Supplementary Note 8)

An optimum camera layout calculation apparatus comprising:

a camera layout generation unit configured to generate a plurality of pieces of the camera layout information based on the environmental object information and camera layout restriction information representing a restriction when a camera is installed in the monitored area;

the camera layout suitability evaluation apparatus according to any one of Supplementary notes 1 to 7 configured to calculate the camera layout suitability for each of the plurality of pieces of the camera layout information; and an optimum camera layout selection unit configured to select the camera layout information having the largest camera layout suitability calculated by the camera layout suitability evaluation apparatus from among the plurality of pieces of the camera layout information and use the selected camera layout information as optimum camera layout information.

(Supplementary Note 9)

A method of controlling a camera layout suitability evaluation apparatus for evaluating whether a layout of a camera placed in a monitored area is suitable for image processing on an object projected in an image captured by the camera, the method comprising:

calculating, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and calculating camera layout suitability based on image processing characteristic information representing a characteristic of the image processing for the image processing performance parameter, the camera layout suitability being obtained by indexing a level of suitability of a camera layout represented by the camera layout information for the image processing of the object.

(Supplementary Note 10)

The method according to Supplementary note 9, wherein the hiding level of the object is determined based on overlapping of the objects determined according to characteristics of the structural object and the placed object or according to a ratio of an area of a hidden region of the object hidden by a movable part of the structural object to an area of an entire region of the object.

(Supplementary Note 11)

The method according to Supplementary note 9, wherein the hiding level of the object is defined by a duration which is a time for which a hidden state of the object continues.

(Supplementary Note 12)

The camera layout suitability evaluation apparatus according to any one of Supplementary notes 9 to 11, wherein the hiding level of the object, the orientation of the object, and the movement of the object are represented by a probabilistic distribution.

(Supplementary Note 13)

The method according to any one of Supplementary notes 9 to 12, wherein in the calculating of the image processing performance parameter, the image processing performance parameter for each position in the monitored area is calculated, and in the calculating of the camera layout suitability, for each position in the monitored area, the camera layout suitability is calculated using the image processing performance parameter calculated for the corresponding position.

(Supplementary Note 14)

The camera layout suitability evaluation apparatus according to Supplementary note 13, wherein the camera layout information includes a plurality of pieces of the camera layout information of a plurality of the cameras, respectively, in the calculating of the image processing performance parameter, for each of the plurality of pieces of the camera layout information, the image processing performance parameter for each position in the monitored area is calculated, in the calculating of the camera layout suitability, for each of the plurality of pieces of the camera layout information, the camera layout suitability for each position in the monitored area is calculated using the image processing performance parameter calculated for the corresponding camera layout information and for the corresponding position, and at a position where visual fields of the plurality of the cameras overlap each other, the largest camera layout suitability from among the camera layout suitabilities calculated for the plurality of pieces of the camera layout information for the plurality of cameras is used as the camera layout suitability at the corresponding position.

(Supplementary Note 15)

The camera layout suitability evaluation apparatus according to any one of Supplementary notes 9 to 14, wherein the environmental object information includes information changing according to a time of day, and in the calculating of the camera layout suitability, the camera layout suitability is calculated for each time of day.

(Supplementary Note 16)

A non-transitory computer readable medium storing a program to cause a computer for evaluating whether a layout of a camera placed in a monitored area is suitable for image processing on an object projected in an image captured by the camera to execute:

calculating, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and calculating camera layout suitability based on image processing characteristic information representing a characteristic of the image processing for the image processing performance parameter, the camera layout suitability being obtained by indexing a level of suitability of a camera layout represented by the camera layout information for the image processing of the object.

INDUSTRIAL APPLICABILITY

The camera layout suitability evaluation apparatus according to the present disclosure can be used to obtain a camera layout suitable for assumed image processing without actually placing cameras in an actual site.

REFERENCE SIGNS LIST

100 CAMERA LAYOUT SUITABILITY EVALUATION APPARATUS
101 IMAGE PROCESSING PERFORMANCE PARAMETER CALCULATION UNIT
102 CAMERA LAYOUT SUITABILITY CALCULATION UNIT
103 ENVIRONMENTAL OBJECT DEPENDENT OBJECT APPEARANCE AND MOVEMENT CHARACTERISTIC INFORMATION STORAGE UNIT
104 IMAGE PROCESSING CHARACTERISTIC INFORMATION STORAGE UNIT
110 CAMERA LAYOUT GENERATION UNIT
120 OPTIMUM CAMERA LAYOUT SELECTION UNIT

The invention claimed is:

1. A camera layout suitability evaluation apparatus for evaluating whether a layout of a camera placed in a monitored area is suitable for image processing on an object projected in an image captured by the camera, the camera layout suitability evaluation apparatus comprising:
   an image processing performance parameter calculation unit configured to calculate, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and
   a camera layout suitability calculation unit configured to calculate camera layout suitability based on image processing characteristic information representing a characteristic of the image processing for the image processing performance parameter, the camera layout suitability being obtained by indexing a level of suitability of a camera layout represented by the camera layout information for the image processing of the object.

2. The camera layout suitability evaluation apparatus according to claim 1, wherein
   the hiding level of the object is determined based on overlapping of the objects determined according to characteristics of the structural object and the placed object or according to a ratio of an area of a hidden region of the object hidden by a movable part of the structural object to an area of an entire region of the object.

3. The camera layout suitability evaluation apparatus according to claim 1, wherein
   the hiding level of the object is defined by a duration which is a time for which a hidden state of the object continues.

4. The camera layout suitability evaluation apparatus according to claim 1, wherein
   the hiding level of the object, the orientation of the object, and the movement of the object are represented by a probabilistic distribution.

5. The camera layout suitability evaluation apparatus according to claim 1, wherein
   the environmental object information includes information changing according to a time of day, and
   the camera layout suitability calculation unit is configured to calculate the camera layout suitability for each time of day.

6. An optimum camera layout calculation apparatus comprising:
   a camera layout generation unit configured to generate a plurality of pieces of the camera layout information based on the environmental object information and camera layout restriction information representing a restriction when a camera is installed in the monitored area;
   the camera layout suitability evaluation apparatus according to claim 1 configured to calculate the camera layout suitability for each of the plurality of pieces of the camera layout information; and
   an optimum camera layout selection unit configured to select the camera layout information having the largest camera layout suitability calculated by the camera layout suitability evaluation apparatus from among the plurality of pieces of the camera layout information and use the selected camera layout information as optimum camera layout information.

7. The camera layout suitability evaluation apparatus according to claim 1, wherein
   the image processing performance parameter calculation unit is configured to calculate the image processing performance parameter for each position in the monitored area, and
   the camera layout suitability calculation unit is configured to calculate, for each position in the monitored area, the camera layout suitability using the image processing performance parameter calculated for the corresponding position.

8. The camera layout suitability evaluation apparatus according to claim 7, wherein
   the camera layout information includes a plurality of pieces of the camera layout information of a plurality of the cameras, respectively,
   the image processing performance parameter calculation unit is configured to calculate, for each of the plurality of pieces of the camera layout information, the image processing performance parameter for each position in the monitored area,
   the camera layout suitability calculation unit is configured to calculate, for each of the plurality of pieces of the camera layout information, the camera layout suitability for each position in the monitored area using the image processing performance parameter calculated for the corresponding camera layout information and for the corresponding position, and
   at a position where visual fields of the plurality of the cameras overlap each other, the largest camera layout suitability from among the camera layout suitabilities calculated for the plurality of pieces of the camera layout information for the plurality of cameras is used as the camera layout suitability at the corresponding position.

9. A method of controlling a camera layout suitability evaluation apparatus for evaluating whether a layout of a camera placed in a monitored area is suitable for image processing on an object projected in an image captured by the camera, the method comprising:

calculating, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and calculating camera layout suitability based on image processing characteristic information representing a characteristic of the image processing for the image processing performance parameter, the camera layout suitability being obtained by indexing a level of suitability of a camera layout represented by the camera layout information for the image processing of the object.

10. A non-transitory computer readable medium storing a program to cause a computer for evaluating whether a layout of a camera placed in a monitored area is suitable for image processing on an object projected in an image captured by the camera to execute:

calculating, for camera layout information representing at least a position, a pose, and an angle of view of the camera placed in the monitored area and environmental object information representing an environmental object including a structural object present in the monitored area and a placed object placed in the structural object, an image processing performance parameter indicating at least one of a hiding level of an object, an orientation of the object, and a movement of the object based on characteristic information representing characteristics of an appearance and a movement of the object determined depending on the environmental object; and calculating camera layout suitability based on image processing characteristic information representing a characteristic of the image processing for the image processing performance parameter, the camera layout suitability being obtained by indexing a level of suitability of a camera layout represented by the camera layout information for the image processing of the object.

* * * * *